United States Patent
Linge et al.

(10) Patent No.: US 11,747,471 B2
(45) Date of Patent: Sep. 5, 2023

(54) PREDICTIVE MAINTENANCE OF EXERCISE MACHINES WITH TIME-OF-FLIGHT SENSORS

(71) Applicant: SONY CORPORATION, Tokyo (JP)

(72) Inventors: Anders Linge, Kävlinge (SE); Jens Rydberg, Lund (SE); Henrik Bengtsson, Lund (SE)

(73) Assignee: Sony Group Corporation, Tokyo (JP)

( * ) Notice: Subject to any disclaimer, the term of this patent is extended or adjusted under 35 U.S.C. 154(b) by 577 days.

(21) Appl. No.: 16/930,745

(22) Filed: Jul. 16, 2020

(65) Prior Publication Data
US 2021/0124028 A1    Apr. 29, 2021

(30) Foreign Application Priority Data

Oct. 25, 2019    (SE) .................................... 1951221-9

(51) Int. Cl.
*G01S 17/10* (2020.01)
*A63B 24/00* (2006.01)
*G01S 7/497* (2006.01)

(52) U.S. Cl.
CPC ............... *G01S 17/10* (2013.01); *A63B 24/00* (2013.01); *A63B 2220/805* (2013.01); *A63B 2220/833* (2013.01); *A63B 2225/02* (2013.01); *G01S 7/497* (2013.01)

(58) Field of Classification Search
CPC ...... G01S 17/10; G01S 7/497; A63B 2225/02
See application file for complete search history.

(56) References Cited

U.S. PATENT DOCUMENTS

| 4,931,767 A * | 6/1990 | Albrecht ................. | B60Q 9/00 356/342 |
| 5,489,149 A * | 2/1996 | Akasu ..................... | G01S 7/497 356/5.1 |
| 6,108,084 A * | 8/2000 | Winner ................. | B60S 1/0822 356/342 |

(Continued)

FOREIGN PATENT DOCUMENTS

| DE | 102017222618 A1 * | 6/2019 |
| EP | 1284153 A2 | 2/2003 |

(Continued)

OTHER PUBLICATIONS

Bengtsson et al. (WO2017178048A1) (Year: 2017).*

(Continued)

*Primary Examiner* — Yuqing Xiao
*Assistant Examiner* — Zhengqing Qi
(74) *Attorney, Agent, or Firm* — TUCKER ELLIS LLP

(57) ABSTRACT

A monitoring device performs a method of detecting a need for maintenance of an exercise machine comprising a time-of-flight, ToF, sensor. The method comprises obtaining a measurement signal from the ToF sensor at a predefined operating condition of the exercise machine. Based on the measurement signal, the method determines a measured distance between the ToF sensor and a reflective element in the exercise machine. The measured distance has been found to be responsive to accumulation of deposits on the ToF sensor and is thus evaluated by the method to detect a need for cleaning. The method thereby enables preventive maintenance.

20 Claims, 4 Drawing Sheets

(56) References Cited

U.S. PATENT DOCUMENTS

| | | | |
|---|---|---|---|
| 2010/0216603 A1* | 8/2010 | Somers | A63B 21/0628 |
| | | | 482/8 |
| 2010/0283888 A1* | 11/2010 | Mirbach | H04N 5/2226 |
| | | | 348/E5.045 |
| 2012/0182553 A1* | 7/2012 | Hulm | G01S 7/483 |
| | | | 356/432 |
| 2016/0158600 A1 | 6/2016 | Rolley | |
| 2018/0050234 A1 | 2/2018 | Kashyap | |
| 2019/0293480 A1* | 9/2019 | Burck | G01G 23/012 |
| 2020/0142042 A1* | 5/2020 | Hibino | G01S 17/42 |

FOREIGN PATENT DOCUMENTS

| | | | |
|---|---|---|---|
| WO | 2015113162 A1 | 8/2015 | |
| WO | 2017178048 A1 | 10/2017 | |
| WO | 2019147174 A1 | 8/2019 | |
| WO | 2019147175 A1 | 8/2019 | |

OTHER PUBLICATIONS

Machine translation of DE102017222618A1 (Year: 2017).*
Extended European Search Report from corresponding European Application No. 20183987.5, dated Dec. 18, 2020, 6 pages.
Swedish Office Action with Swedish Search Report from corresponding Swedish Application No. 1951221-9, dated Mar. 25, 2020, 5 pages.

* cited by examiner

PREDICTIVE MAINTENANCE OF EXERCISE MACHINES WITH TIME-OF-FLIGHT SENSORS

RELATED APPLICATION DATA

This application claims the benefit of Swedish Patent Application No. 1951221-9, filed Oct. 25, 2019, the disclosure of which is incorporated herein by reference in its entirety.

TECHNICAL FIELD

The present disclosure relates generally to exercise machines, and, more particularly, to exercise machines comprising time-of-flight sensors and techniques for detecting a need for maintenance of such exercise machines.

BACKGROUND

Exercise and physical fitness are steadily gaining in popularity. The growing interest in physical fitness is reflected by the growing number of gyms found in both public and private settings.

Exercise machines are often used for physical exercise, for example weight machines in which stacked weight plates are lifted by the user against the action of gravity. Conventionally, the user has to keep a manual record of the exercises performed on the machines and the outcome of the respective exercise.

Recently, automated monitoring systems have been developed to help a user to track and record progress on exercise machines. One example is disclosed in WO2019/147174, in which exercise machines are arranged to transmit exercise data and machine identity data for storage at a server, which is arranged to allow the user to access its exercise data, for example to evaluate progress in training. The respective exercise machine is configured to generate the exercise data by use of a sensor arrangement arranged at the stacked weight plates to detect their movement. The sensor arrangement may thereby provide data on the number of repetitions performed and the number of weight plates lifted. Such data may be at least partly obtained from output data of one or more time-of-flight (ToF) sensors, which measure distance in the exercise machine by transmitting a signal and receiving a reflection of the transmitted signal.

One challenge of automated monitoring systems is to ensure operability of the sensor arrangement in the respective exercise machine over time. Contamination by dirt, dust, oil, sweat and other deposits is likely to occur in exercise settings, which inherently exhibit significant human movement, sweating, etc. ToF sensors are sensitive to contamination and will require cleaning from time to time. The amount of deposits accumulated on the respective exercise machine may depend on its location with the gym, the type of ventilation system, the cleaning procedure, the frequency of cleaning, etc. Typically, all exercise machines in a gym would have to be cleaned at regular intervals irrespective of the actual degree of fouling of the individual exercise machine, requiring a significant work effort.

SUMMARY

It is an objective to at least partly overcome one or more limitations of the prior art.

A further objective is to enable predictive maintenance of exercise machines that comprise one or more time-of-flight sensors.

A yet further objective is to provide a technique of detecting a current or upcoming need for cleaning of time-of-flight sensors in exercise machines.

One or more of these objectives, as well as further objectives that may appear from the description below, are at least partly achieved by methods, computer-readable media and apparatuses for detecting a need for maintenance of an exercise machine comprising time-of-flight sensor in accordance with first and second main embodiments.

The first main embodiment comprises a method of detecting a need for maintenance of an exercise machine comprising a time-of-flight sensor. The method comprises: obtaining a measurement signal from the time-of-flight sensor at a predefined operating condition of the exercise machine; determining, based on the measurement signal, a measured distance between the time-of-flight sensor and a reflective element in the exercise machine; and evaluating the measured distance for detection of the need for maintenance.

The first main embodiment further comprises a computer-readable medium comprising computer instructions which, when executed by a processor, cause the processor to perform the method of the first main embodiment.

The first main embodiment further comprises an apparatus configured to detect a need for maintenance of an exercise machine comprising a time-of-flight sensor, the apparatus comprising: an input for receiving a measurement signal from the time-of-flight sensor, and logic configured to: obtain the measurement signal via the input, the measurement signal being generated by the time-of-flight sensor at a predefined operating condition of the exercise machine; determine, based on the measurement signal, a measured distance between the time-of-flight sensor and a reflective element in the exercise machine; and evaluate the measured distance for detection of the need for maintenance.

The second main embodiment comprises a method of detecting a need for maintenance of an exercise machine comprising a time-of-flight sensor, the method comprising: obtaining, by the time-of-flight sensor during a measurement period, a plurality of measurement values indicative of measured distance between the time-of-flight sensor and a reflective element in the exercise machine, each of the measurement values corresponding to a respective signal pulse emitted by the time-of-flight sensor, computing one or more evaluation parameters as a function of the plurality of measurement values, and evaluating the one or more evaluation parameters for detection of the need for maintenance.

The second main embodiment further comprises computer-readable medium comprising computer instructions which, when executed by a processor, cause the processor to perform the method of the second main embodiment.

The second main embodiment further comprises an apparatus configured to detect a need for maintenance of an exercise machine comprising a time-of-flight sensor, the apparatus comprising: an input for receiving a measurement signal from the time-of-flight sensor, and logic configured to: obtain, via the input, a plurality of measurement values indicative of distance between the time-of-flight sensor and a reflective element in the exercise machine, each of the measurement values corresponding to a respective signal pulse emitted by the time-of-flight sensor during a measurement period; compute one or more evaluation parameters as a function of the plurality of measurement values; and evaluate the one or more evaluation parameters for detection of the need for maintenance.

Still other objectives, as well as features, embodiments, aspects and technical effects will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of the associated listed items.

Figure 1A:
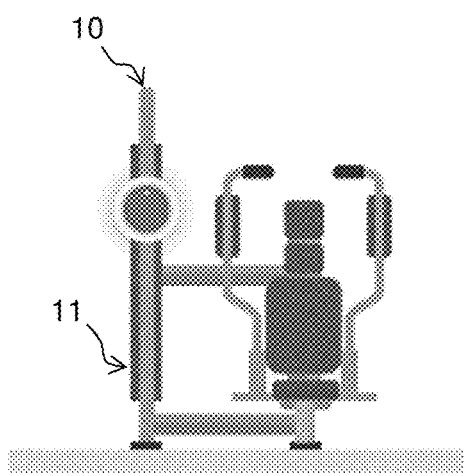
FIGS. 1A-1C illustrate an exercise machine that includes a ToF sensor for repetition detection.
Figure 1B:
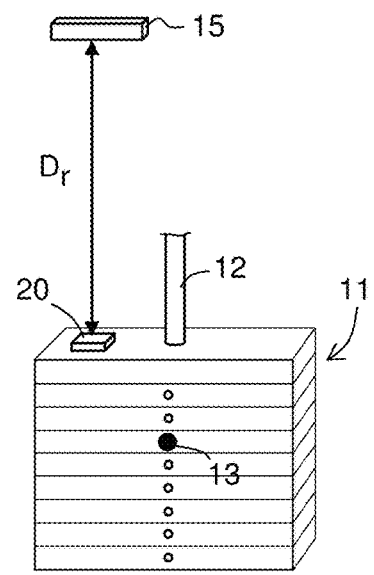
Figure 1C:
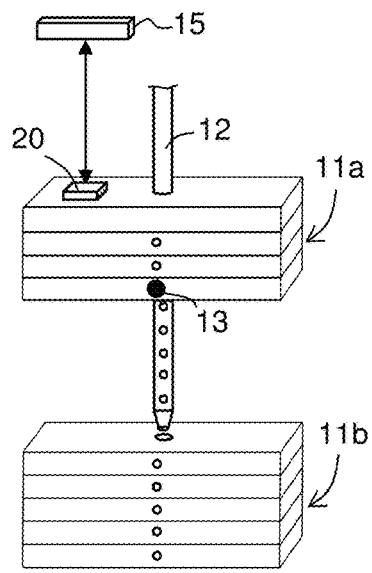

FIG. 1A is an isometric view of a stacked weight exercise machine 10 having a plurality of weights 11. FIGS. 1B-1C depict the arrangement of weights 11 in further detail. The exercise machine 10 comprises a lifting mechanism 12 and an engaging member ("selector pin") 13 for selectively engaging a number of stacked weights to the lifting mechanism 12. The lifting mechanism 12 may be coupled, in a manner well known to the skilled person, to one or more gripping or pushing members via one or more cables, belts, rods, etc. In the illustrated example, the lifting mechanism 12 includes a support member having a rod-shaped portion, configured to pass vertically through corresponding holes in the weights 11. The support member 12 may further include a top portion, such as a fixed top weight. A sensor arrangement is associated with the weights 11 and comprises a time-of-flight (ToF) sensor 20 and a reflective element ("reflector") 15. In the illustrated example, the ToF sensor 20 is arranged on top of the stacked weights 11 and is thus moving when a user performs an exercise in the machine 10. The reflector 15 is located at a fixed position spaced from the top of the weights 11. For example, the reflector 15 may be attached to or part of the frame of the machine 10. In a variant, not shown, the positions of the ToF sensor 20 and the reflector 15 may be reversed.

In exercise machines comprising stacked weights, the user may typically select how many of the weights should be used or engaged in the exercise, by inserting the selector pin 13 in one of the weights. During exercise, the user will then lift the selected weights, as exemplified in FIG. 1C, where the selected portion 11a of the stacked weights is lifted in relation to a remaining portion 11b. The training may be tracked by monitoring how many times the selected weights are lifted (number of repetitions) and, optionally, how many weights are selected to be lifted.

The exercise machine 10 has a "rest state", which is attained when the user does not apply force to the machine 10. In the example of FIGS. 1B-1C, the rest state (FIG. 1B) results in a maximum distance ("rest distance") Dr between the ToF sensor 20 and the reflector 15. When not in the rest state, the machine 10 is in a loaded state (FIG. 1C) at which the distance is smaller than the maximum distance Dr. The exercise machine may or may not attain the rest state between repetitions, depending on the training schedule of the specific user.

The sensor arrangement is configured to provide sensor data indicative of a measured distance between the sensor 20 and the reflector 15. The sensor data thereby enables determination of the number of repetitions. For example, a repetition may be detected when the measured distance has changed a predetermined amount from the rest distance, which thus corresponds to the selected portion 11a being lifted a given distance, and/or when the measured distance starts to increase after having decreased, which corresponds to the selected portion 11a being lifted from and then returned towards an initial position.

The exercise machine may be connected to an exercise monitoring system which allows the user to access exercise data that quantifies the exercise performed in the exercise machine by the user. The structure and functionality of the exercise monitoring system and the communication of data from the exercise machine goes beyond the scope of the present disclosure. The above-mentioned sensor data may be transmitted, optionally after further processing, from the exercise machine over any suitable wired and/or wireless communication channel, in real time during the exercise or after a completed session. In some embodiments, the user may also be allowed to enter data to the exercise monitoring system via a user interface on the exercise machine or on a handheld or wearable user device connected to the exercise monitoring system.

It is to be understood that the sensor arrangement may include one or more further sensors (not shown) configured to provide further sensor data, for example sensor data indicative of the selected weights. For example, as disclosed in WO2015/113162 and WO2017/178048, such a further sensor may be arranged to measure the distance between the selector pin 13 and a reference point, which is located such that the measured distance is indicative of the selected weight. The sensor also may be a ToF sensor, and the distance may be measured between the selector pin 13 and a reference point on the selected portion 11a above the selector pin 13 (for example, on top of the stacked weights) or between the selector pin 13 and a stationary reference point beneath the selector pin 13. Alternatively, the user may enter the selected weight manually via the above-mentioned user interface.

Time-of-flight (ToF) is an established technique for distance determination ("range finding" or "ranging") and involves measuring the roundtrip time of a signal provided by a source onto a target, with the distance being given by half the roundtrip time multiplied by the propagation speed of the signal. The signal is typically an electromagnetic signal, for example a light signal in the ultraviolet, visible or infrared wavelength range. The light signal may be generated by a laser or an LED.

There are two main principles for determining the roundtrip time, denoted "direct method" and "indirect method" herein. In the direct method, the signal is emitted in pulses and the roundtrip time is given by the time difference between an outgoing signal pulse and a corresponding incoming (reflected) signal pulse. The direct method may involve timestamping outgoing signal pulses and incoming signal pulses and computing the difference between corresponding timestamps. In a variant, the direct method may involve synchronizing the detection of incoming signal pulses with the generation of outgoing signal pulses (for example, by use of a so-called gate detector), thereby making the detected signal strength of the incoming signal proportional to the distance. The distance may be given by a single pulse but to improve SNR a plurality of single-pulse measurements may be combined to produce a measured distance. In the indirect method, a modulated signal is emitted and the roundtrip time is given by the phase difference between the outgoing signal and the incoming (reflected) signal. The modulated signal may, for example, be sinusoidal. The modulation frequency sets the maximum range of the ToF sensor 20, i.e. the largest distance that may be measured. Any type of phase detector may be used for detecting the phase difference between the signals.

Figure 2A:
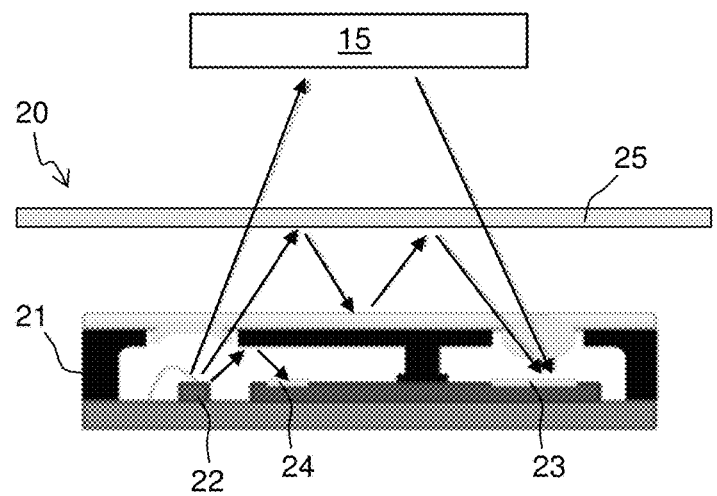
FIGS. 2A-2B are section views of an electrooptical module of a ToF sensor and illustrate paths of outgoing and incoming signals, without and with deposits on a front window.

FIG. 2A shows an example of a ToF module 21 in a ToF sensor 20 for use in the exercise machine 10 of FIG. 1. The module 21 comprises a source 22 for emitting an outgoing signal and a detector 23 for detecting an incoming signal, which is generated by reflection of the outgoing signal against the reflector 15. In the illustrated example, the module 21 further comprises a reference detector 24 which is arranged to provide an electric signal representative of the outgoing signal. The ToF sensor 20 further comprises a front panel 25 which is arranged to transmit the outgoing and incoming signals while protecting the module 21 and its sensitive electrooptical components. As indicated in FIG. 2A, the provision of the front panel 25 introduces an internal signal path between the source 22 and the detector 23, in addition to the external signal path from the source 22 to the detector 23 via the reflector 15. The internal signal path is known as cross-talk and introduces noise in the distance measurement. FIG. 2B corresponds to FIG. 2A but illustrates a situation with deposits 30 on the front panel 25. The deposits 30 will scatter the outgoing signal and result in increased cross-talk, as schematically indicated by grey arrows in FIG. 2B. Thereby, deposits 30 will increase measurement noise and reduce measurement accuracy, ultimately producing totally unreliable distance measurements.

Figure 2C:
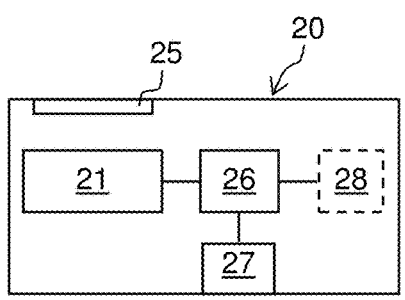
FIG. 2C is a schematic diagram of the electrooptical module arranged inside a ToF sensor.
Figure 2B:
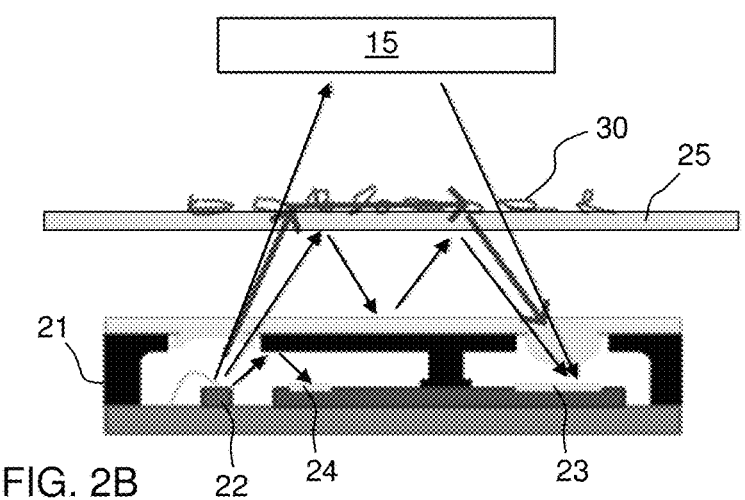

FIG. 2C schematically depicts an example configuration of a ToF sensor 20 for use in an exercise machine 10, for example as depicted in FIGS. 1A-1C. In the illustrated example, a ToF module 21 is arranged within a protective housing comprising the front panel 25. The ToF sensor 20 further comprises a processing unit 26 which is configured to control the operation of the ToF module 21 and to process electric signals provided by the sensors 23, 24 to determine a measured distance to the reflector 15. The processing unit 26 is also configured to output a measurement signal via an output interface 27, which is arranged for wired or wireless data transmission.

As used herein, a "distance" is not restricted to units of length but could be given in any other unit that is equivalent to a unit of length. For example, a distance measured by a ToF sensor 20 may, instead of a unit of length, be given by the above-mentioned roundtrip time, half the roundtrip time, or any other quantity derived from the roundtrip time.

Figure 3:
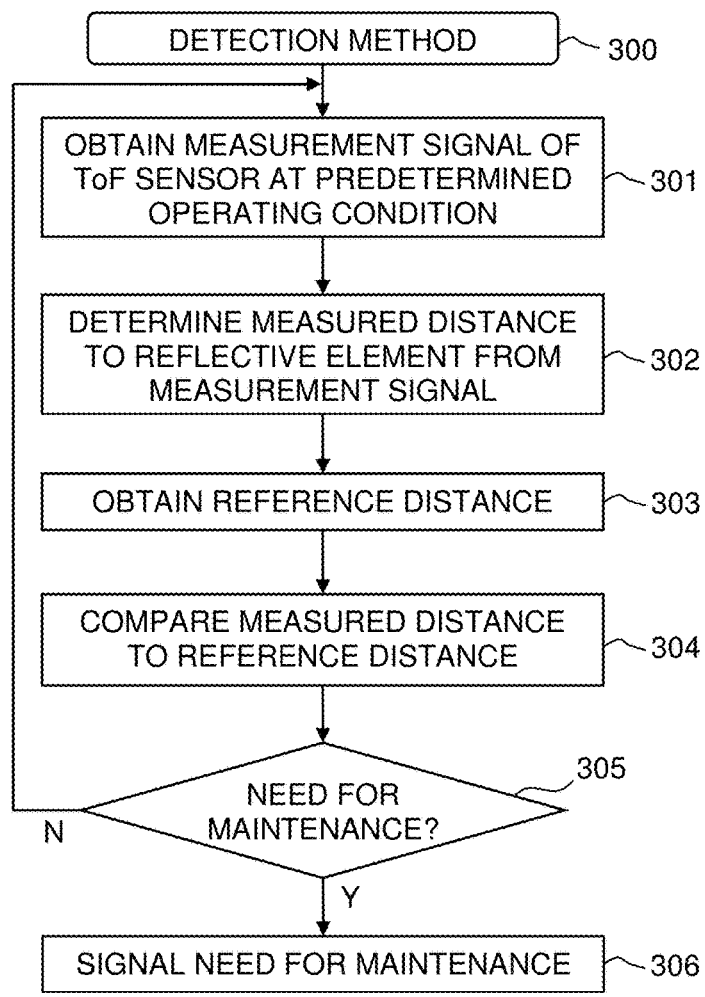
FIG. 3 is a flow chart of a detection method in accordance with a first main embodiment.

FIG. 3 is a flow chart of a detection method 300 in accordance with a first main embodiment. The method 300 may be performed by the ToF sensor 20 (cf. processing unit 26 in FIG. 2C), by a separate monitoring device (40 in FIGS. 8A-8D) based on the measurement signal from the ToF sensor 20, or by a combination thereof. The detection method 300 aims at detecting a need for cleaning the ToF sensor 20, specifically its front panel 25. Intuitively, the measured signal strength at the sensor 23 might be believed to represent fouling of the ToF sensor 20. However, it has been found that such fouling (cf. deposits 30 in FIG. 2B) generally does not result in a significant reduction in signal strength at the detector 23, but rather causes a redistribution of signal from the external signal path to the internal signal path of the ToF sensor 20. The first main embodiment is instead based on the surprising finding that the measured distance by the ToF sensor 20, for a fixed actual distance, will decrease with increasing fouling of the front panel 25. Thus, by evaluating the measured distance over time, a need for cleaning may be inferred in advance of a situation in which the measurement signal from the ToF sensor 20 misrepresents the training performed in the exercise machine. It is presently believed that the first main embodiment is particularly useful for predictive maintenance of ToF sensors 20 that operate by the indirect method.

The method 300 comprises a step 301 of obtaining, at a current time, a measurement signal of the ToF sensor 20 at a predetermined operating condition of the exercise machine 20. The current time is thus any time point when the exercise is in the predetermined operating condition. In the predetermined operating condition, the exercise machine 10 attains a fixed actual distance between the ToF sensor 20 and the reflector 15. The actual distance is thus a physical distance in the exercise machine and is effectively constant over time. In one embodiment, the predetermined operating condition involves the weight stack 11 being immobile, for example when the machine 10 is in its rest state, or substantially in its rest state. In the illustrated example of FIGS. 1B-1C, the rest state corresponds to a maximum distance between the ToF sensor 20 and the reflector 15. In other implementations, the rest state may correspond to a minimum distance, for example if distance is measured between the selector pin 13 and a reference point below the selector pin 13.

In one example, step 301 may be performed at a time point when the machine 10 is known to be in its rest position, for example during closing hours of a gym. In another example, if the user is required to check in to the above-mentioned exercise monitoring system before starting the training session at the exercise machine and check out after completing the training session, step 301 may be performed between check-ins. In a further example, step 301 may be performed responsive to a signal indicative of the predefined operating condition. Such a signal may be provided by a motion sensor attached to or included in the ToF sensor 20, the weight stack 11, the selector pin 13 or the lifting mechanism 12. The motion sensor, exemplified as 28 in FIG. 2C, may include an accelerometer, a vibration sensor, etc. The signal may alternatively be provided by a switch on the machine or in a machine management system, which may be actuated by an operator (for example, a gym manager) to trigger step 301 at one or more exercise machines.

In step 302, a measured distance is determined based on the measurement signal. The measured distance is thus a perceived distance between the ToF sensor 20 and the reflector 15 at the predetermined operating condition.

In steps 303-305, the measured distance is evaluated for detection of a need for maintenance of the exercise machine 10. In the illustrated example, step 303 obtains a reference distance 303, step 304 checks the measured distance with respect to the reference distance, for example by comparing the distances, and step 305 decides if there is a need for maintenance based on the outcome of step 304. If no need for maintenance is detected by step 305, the method 300 may return to perform step 301 at a subsequent time point (i.e., at a new "current time"). When a need for maintenance is detected by step 305, the method may proceed to step 306, which generates an output signal to indicate a need for maintenance. The need for maintenance of this specific machine may, for example, be signaled locally by an audible and/or visual indication on a feedback unit (not shown) on the exercise machine, or may be signaled centrally to a provider, for example a manager of a gym that hosts the machine, by an email, an alert in a machine management system, etc.

In the example of FIGS. 1B-1C, if the predetermined operating condition is the rest state of the machine 10, the reference distance is or represents the distance Dr in FIG. 1B.

In one embodiment of the detection method 300, step 303 retrieves the reference distance from a memory. The reference distance in the memory may be predefined for the exercise machine, for example given by a nominal value or be set by calibration in production of the machine.

Figure 4:
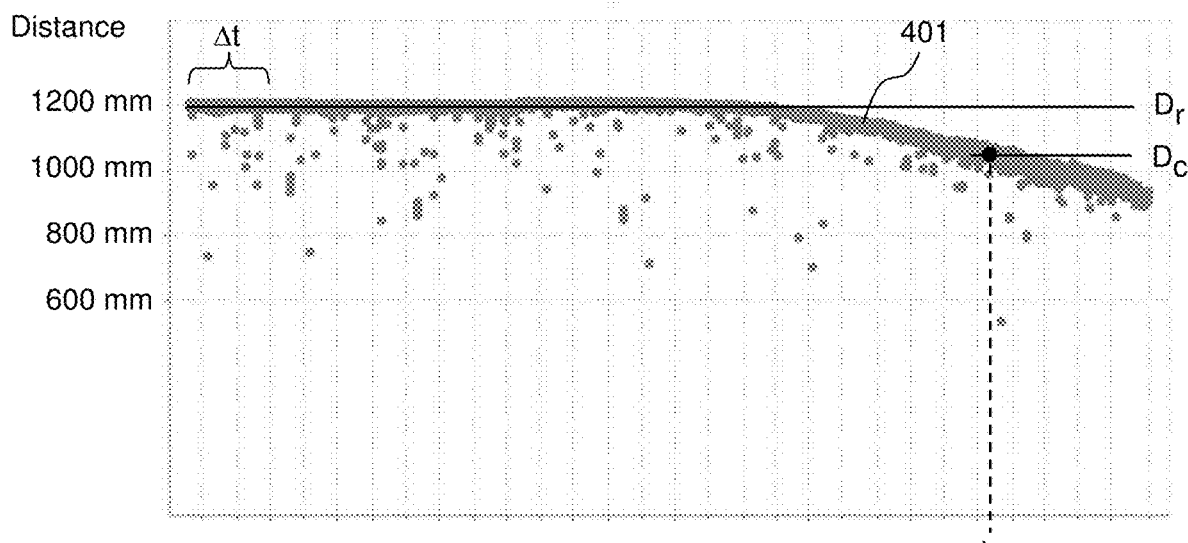
FIGS. 4-5 are graphs showing examples of measured distance values as a function of time for a ToF sensor.

Alternatively, the reference distance in the memory may have been determined by the method 300 by receiving the measurement signal generated by the ToF sensor 20 at an earlier time ("reference time") when the exercise machine 10 is in the predefined operating condition (corresponding to step 301) and by determining the reference distance as a function of the measurement signal (corresponding to step 302). The reference distance may thus be given by the measured distance at the reference time, assuming that the ToF sensor 20 is substantially clean at the reference time. In one example, the reference time may be set to directly follow upon a cleaning of the ToF sensor 20. Thus, the method 300 may determine the reference distance whenever an operator signals, by any suitable means, that cleaning has been completed. It is conceivable that the reference time extends over a time period and that the reference distance is given as an aggregated value (average, median, etc.) of a plurality of measured distances determined during this time period. An example is illustrated in FIG. 4. Grey dots represent values of measured distance 401 as a function of time in the exercise machine of FIG. 1. The reference distance, Dr, is computed based on a plurality of measured distances within a time period, Δt, at the reference time. FIG. 4 also illustrates a measured distance, Dc, determined for a current time, tc. For example, if the difference between Dr and Dc exceeds a predefined threshold, steps 304-305 of method 300 may detect a need for maintenance. The threshold may be set to allow for preventive maintenance. Steps 304-305 may require plural differences to exceed the threshold before detecting the need for maintenance.

It should be noted that the evaluation in steps 303-305, instead of or in addition to being made in relation to a reference distance, may detect the need for maintenance based on a trend analysis of the progression of measured distances 401, e.g. by statistical analysis of the measured distances up to the current time, by analysis of the derivate of a curve fitted to the measured values up to the current time, by extrapolation of the measured values up to the current time, etc.

Figure 5:
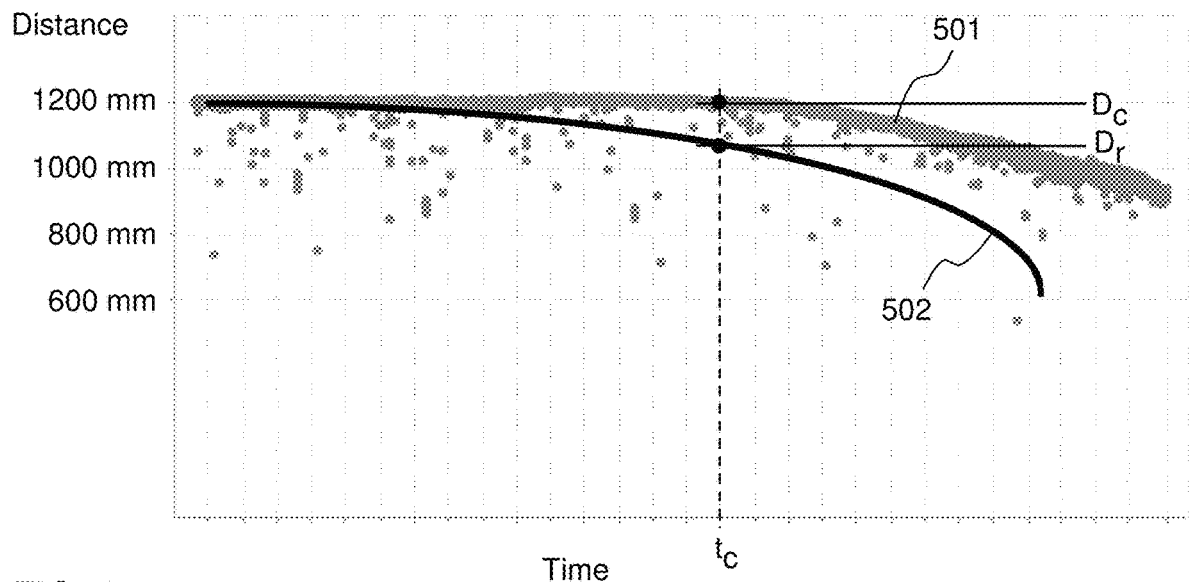

In an alternative implementation of the method 300, exemplified in FIG. 5, step 303 obtains the reference distance at the current time, tc, but with a different range setting of the ToF sensor 20 compared to the range setting used in step 301. The range setting defines the largest distance (maximum range) that the ToF sensor 20 is capable of measuring. Most commercially available ToF sensors 20 provide the option of changing the range setting. It has been found that the sensitivity to fouling, with respect to measured distance, differs between range settings. In the example of FIG. 5, grey dots represent values of measured distance 501 as a function of time with a first range setting of the ToF sensor 20, and the curve 502 schematically depicts measured distance with a second range setting of the ToF sensor 20. In this example, the second range setting has a larger maximum range than the first range setting. Step 303 may comprise receiving the measurement signal generated by the ToF sensor 20 when set in the second range setting and at the predefined operating condition of the exercise machine 10 (corresponding to step 301) and determining the reference distance as a function of the measurement signal (corresponding to step 302). Steps 304-305 may be performed as shown in FIG. 3, by step 304 checking the measured distance with respect to the reference distance, for example by comparing the distances, and by step 305 deciding if there is a need for maintenance based on the outcome of step 304. For example, if the difference between Dr and Dc exceeds a predefined threshold, steps 304-305 of method 300 may detect a need for maintenance. The threshold may be set to allow for preventive maintenance. Steps 304-305 may require plural differences to exceed the threshold before detecting the need for maintenance.

Although FIG. 5 shows an example where the measured distance and the reference distance are determined at exactly the same time point, this is not necessary. Generally, the measured distance and the reference distance may be obtained a different time points as long as the changes in measured distance and reference distance are small between these time points.

It may also be noted that more than two range settings may be used in step 303, and that step 304 may involve evaluating a measured distance (for a first range setting) in relation to two or more reference distances (for a corresponding number of second range settings).

The embodiment exemplified in FIG. 5 obviates the need to determine and store a reference distance representative of a substantially clean ToF sensor and thereby simplifies deployment of the method 300. Further, it is currently believed that the embodiment exemplified in FIG. 5 may result in an increased sensitivity to fouling. For example, as indicated at tc in FIG. 5, fouling may be detected even when the measured distance at the first range setting is substantially unaffected by fouling.

It should also be noted that the embodiments exemplified with reference to FIG. 4 and FIG. 5 may be combined, for example by the evaluation in steps 304-305 evaluating a measured distance determined for a first range setting in relation to both a first reference distance representative of a substantially clean ToF sensor (for example, determined for Δt in FIG. 4) and a second reference distance determined for a second range setting.

Figure 6:
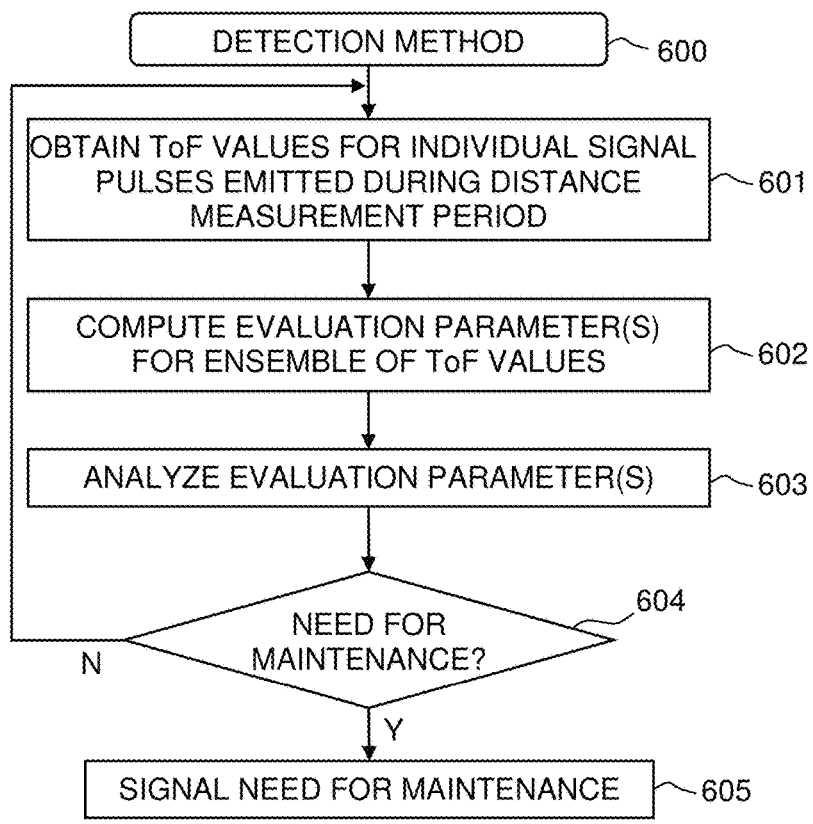
FIG. 6 is a flow chart of a detection method in accordance with a second main embodiment.

FIG. 6 is a flow chart of a detection method 600 in accordance with a second main embodiment. The method 600 may be performed by the ToF sensor 20 (cf. processing unit 26 in FIG. 2C), by a separate monitoring device (40 in FIGS. 8A-8D) based on the measurement signal from the ToF sensor 20, or by a combination thereof. The detection method 600 has the same objective as the detection method 300 but is based on a different type of measurement data and a different evaluation thereof. The method 600 operates on ToF values ("measurement values") internally computed by the ToF sensor 20 for individual signal pulses emitted during a distance measurement period of the ToF sensor 20. The distance measurement period results in a single value of the measured distance, which is thus determined as a function of the ToF values. The individual ToF values may be represented as roundtrip time, distance, etc. It has been found that the distribution of the ToF values, obtained during the distance measurement period, changes with increasing fouling of the ToF sensor 20. As used herein, a "distribution" represents the frequency of different ToF values. It is presently believed that the second main embodiment is useful for predictive maintenance of ToF sensors 20 that are configured to emit signal pulses, i.e. at least ToF sensors that operate by the direct method.

The method 600 comprises a step 601 of obtaining, by the ToF sensor 20 during a distance measurement period, a plurality of ToF values indicative of measured distance between the ToF sensor 20 and the reflector 15, each of the ToF values corresponding to a respective signal pulse emitted by the ToF sensor 20. In step 602, evaluation parameter data is computed as a function of the plurality of ToF values. The evaluation parameter data may comprise one or more evaluation parameters. In steps 603-604, the evaluation parameter data is analyzed for detection of a need for maintenance. If step 604 does not detect a need for maintenance, the method 600 may return to perform step 601 for a distance measurement period at a subsequent time point. When a need for maintenance is detected by step 604, the method may proceed to step 605, which may be identical to step 306 of method 300.

Figure 7A:
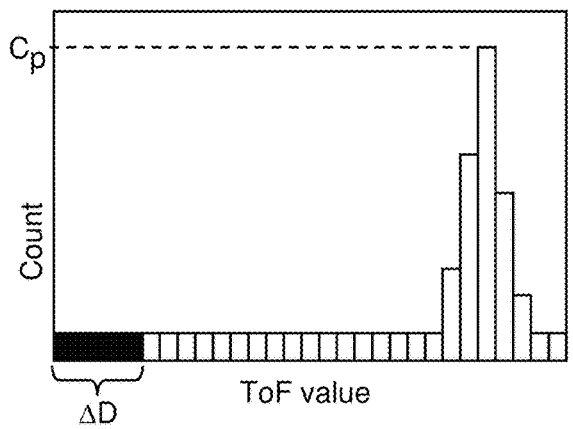
FIGS. 7A-7B exemplify the distribution of ToF values computed for a sequence of outgoing signal pulses emitted by a ToF sensor during a measurement period, without and with deposits on a front window.
Figure 7B:
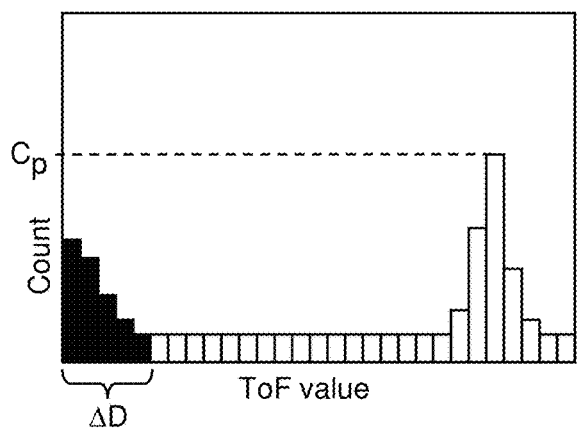

An example of the change in distribution of ToF values is illustrated in FIGS. 7A-7B, which are schematic histograms of ToF values. In the respective histogram, the entire range of ToF values is divided into a series of non-overlapping intervals (also known as bins). The vertical axis represents the number ("count") of ToF values that fall within the respective bin. FIG. 7A exemplifies the distribution for a clean ToF sensor 20, where the ToF values form a peak with count Cp. The location of the peak in ToF value corresponds to the measured distance between the ToF sensor 20 and the reflector 15. FIG. 7B exemplifies the distribution for a ToF sensor 20 with some fouling on the front panel 25. As seen, the magnitude of the peak (count Cp) has decreased and the number of small ToF values has increased. This is due to the redistribution from the external signal path to the internal signal path as represented in FIG. 2B.

It is realized that are various evaluation parameters that may be computed in step 602 to represent the change in distribution illustrated in FIGS. 7A-7B. In one non-limiting example, step 602 determines an aggregated count of the ToF values that are indicative of distances within a predefined subset of the total measurement range of the ToF sensor 20. The predefined subset corresponds to a distance interval and is selected to include at least a portion of the ToF values originating from the internal signal path. Thus, the predefined subset is suitably located at a lower end of the total measurement range of the ToF sensor 20 and thus corresponds to small distances. In FIGS. 7A-7B, the distance interval is designated by ΔD, and the bins that fall within ΔD are marked as black. While steps 603-604 may detect a need for maintenance solely based on the aggregated count of ToF values within ΔD, the specificity of detection may be improved by also including the peak value, Cp, in the analysis by step 603, for example by evaluating the aggregated count in relation to the peak value. In one non-limiting example, the degree of fouling of the ToF sensor may be assessed based on the ratio or difference between the peak value and the aggregated count. In other embodiments, step 602 may comprise evaluating all or part of the distribution of ToF values in relation to a reference distribution. For example, the reference distribution may be given by the distribution for a clean ToF sensor (FIG. 7A), and an evaluation parameter may be computed to represent a difference between a current distribution and the reference distribution.

As understood from FIGS. 7A-7B, in some embodiments, the detection method 600 is performed such that the measured distance is spaced from the distance interval, ΔD. This may be inherent to the exercise machine, if configured such that the smallest distance that may be attained between the ToF sensor 20 and the reflector 15 exceeds the distances in the distance interval, ΔD. Otherwise, step 601 may be selectively performed at a time point when the distance between the ToF sensor 20 and the reflector 15 is known to lie outside the distance interval, ΔD. For example, step 601 may be performed at a predetermined operating condition of the machine 10, for example in its rest state, by analogy with the first main embodiment.

The detection methods exemplified hereinabove may be implemented by a monitoring device 40 which is physically separated from the ToF sensor 20, e.g. as shown in FIGS.

Figure 8A:
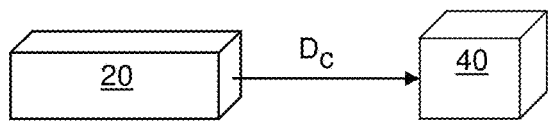
FIGS. 8A-8D show examples of data transmission from a ToF sensor to a monitoring device in accordance with various embodiments.
Figure 8B:
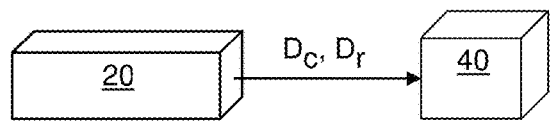
Figure 8C:
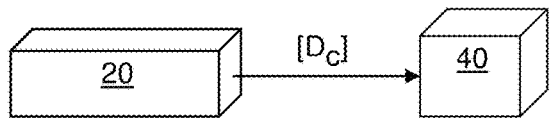
Figure 8D:

8A-8D. Although not shown, the monitoring device 40 may be connected to receive measurement signals from ToF sensors in a plurality of exercise machines in one or more locations. The respective measurement signal may be communicated to the monitoring device by wire and/or wirelessly, and optionally over one or more networks of any type. FIGS. 8A-8D illustrate different types of data that may be included in the measurement signal from the ToF sensor 20, in addition to a unique identifier of the exercise machine 10 and/or the ToF sensor 20. In FIG. 8A, the monitoring device 40 may implement the method 300. The measurement signal contains the measured distance, Dc, at a respective time (cf. step 301). The measured distance at the respective time is thus computed internally of the ToF sensor 20. In FIG. 8B, the monitoring device 40 may implement the method 300. The measurement signal contains the measured distance, Dc, at a first range setting of the ToF sensor 20 and the reference distance, Dr, at a second range setting of the ToF sensor 20 (cf. steps 301, 303). In FIG. 8C, the monitoring device 40 may implement either of the methods 300, 600. The measurement signal contains an ensemble of ToF values, [Dc], which are computed by the ToF sensor 20 for individual signal pulses during the above-mentioned distance measurement period. When implementing the method 300, the monitoring device 40 may determine the measured distance, Dc, as a function of the ensemble of ToF values, by any suitable aggregation algorithm, thereby completing step 301. When implementing the method 600, the monitoring device 40 may compute the evaluation parameter data based on the ensemble of ToF values, in accordance with step 602. In FIG. 8D, the monitoring device 40 may implement the method 600. The measurement signal contains evaluation parameter data. The computation of the evaluation parameter data in step 602 is thus at least partly performed by the ToF sensor 20.

The data transfer between the ToF sensor 20 and the monitoring device 40 may be performed by a push or pull mechanism, or a combination thereof. In one example, the ToF sensor 20 is configured to repeatedly transmit the measurement signal to the monitoring device 40, for example every hour, and the monitoring device 40 selects the appropriate measurement signal to analyze. For example, the monitoring device 40 may select a measurement signal containing data obtained during closing hours of a gym to ensure that the respective exercise machine is in its rest state. In another example, the monitoring device 40 may be configured to actively request the measurement signal from the respective ToF sensor 20 at a selected time.

In an alternative to the embodiments in FIGS. 8A-8D, the monitoring device 40 may be arranged on the exercise machine 10 or be integrated with the ToF sensor 20.

Figure 9:
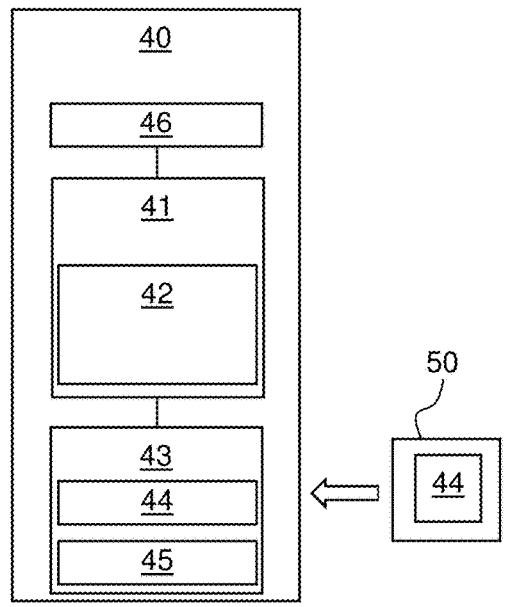
FIG. 9 is a block diagram of a monitoring device in accordance with an embodiment.

FIG. 9 is a block diagram of an exemplifying structure of the monitoring device 40. Generally, the monitoring device 40 may be configured to perform any of the methods described herein, or part thereof, by a combination of software and hardware circuitry, or exclusively by specific hardware circuitry. In FIG. 9, the monitoring device 40 comprises a control circuit 41 responsible for the overall operation of the monitoring device 40. As shown, the control circuit 41 may include a processing device or processor 42, which may be or include a central processing unit (CPU), graphics processing unit (GPU), microcontroller, microprocessor, ASIC, FPGA, or any other specific or general processing device. The processor 42 may execute instructions 44 stored in a separate memory, such as memory 43, and/or in an internal memory (not shown) of the control circuit 41, in order to control the operation of the monitoring device 40. The instructions 44 when executed by the processor 42 may cause the monitoring device 40 to perform any of the methods described herein, or part thereof. The instructions 44 may be supplied to the monitoring device 40 on a computer-readable medium 50, which may be a tangible (non-transitory) product (for example magnetic medium, optical disk, read-only memory, flash memory, etc.) or a propagating signal. As indicated in FIG. 9, the memory 43 may also store data 45 for use by the processor 42, for example one or more reference distances, one or more reference distributions, etc. The memory 43 may comprise one or more of a buffer, a flash memory, a hard drive, a removable media, a volatile memory, a non-volatile memory, a random access memory (RAM), or another suitable data storage device. In an exemplary arrangement, the memory 43 includes a non-volatile memory for long term data storage and a volatile memory that functions as system memory for the control circuit 41. The memory 43 may exchange data with the control circuit 41 over a data bus. Accompanying control lines and an address bus between the memory 43 and the control circuit 41 also may be present. The memory 43 is considered a non-transitory computer readable medium. The monitoring device 40 may further include an input 46, which may include any conventional communication interface for wired or wireless communication. The input 46 is arranged to receive measurement signal(s) from one or more ToF sensors 20.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results.

The methods and devices described herein are not limited to weight stack exercise machines or to vertical movement of weights but are applicable to any exercise machine that comprises at least one ToF sensor for distance measurement. Examples of such types of exercise machines include plate loaded machines, elliptical trainers, stationary exercise bikes, stepper machines, rowing machines, and cross-country ski machines.

In the following, items are recited to summarize some aspects and embodiments as disclosed in the foregoing.

Item 1: A method of detecting a need for maintenance of an exercise machine (10) comprising a time-of-flight sensor (20), the method comprising:

obtaining (301) a measurement signal from the time-of-flight sensor (20) at a predefined operating condition of the exercise machine (10);

determining (302), based on the measurement signal, a measured distance (Dc) between the time-of-flight sensor (20) and a reflective element (15) in the exercise machine (10); and evaluating (304, 305) the measured distance (Dc) for detection of the need for maintenance.

Item 2: The method of item 1, wherein the evaluating (303-305) comprises checking the measured distance (Dc) with respect to a reference distance (Dr).

Item 3: The method of item 2, further comprising: receiving a measurement signal generated by the time-offlight sensor (20) at a reference time (Δt) when the exercise machine 10 is in the predefined operating condition, and determining (303) the reference distance (Dr) as a function of the measurement signal generated by the time-of-flight sensor (20) at the reference time (Δt).

Item 4: The method of item 2 or 3, wherein said obtaining (301) comprises obtaining the measurement signal for a first range setting of the time-of-flight sensor (20), the method further comprising: receiving a measurement signal from the time-of-flight sensor (20) for a second range setting of the time-of-flight sensor (20) at the predefined operating condition of the exercise machine (10), the second range setting being different from the first range setting, and determining (303) the reference distance (Dr) based on the measurement signal received from the time-of-flight sensor (20) for the second range setting.

Item 5: The method of item 2, wherein the reference distance (Dr) is a predefined distance associated with the predefined operating condition of the exercise machine (10).

Item 6: The method of any one of items 2-5, wherein the need for maintenance is detected when a difference between the measured distance (Dc) and the reference distance (Dr) exceeds a threshold.

Item 7: The method of any one of items 1-6, wherein at least one of the time-of-flight sensor (20) and the reflective element (15) is moveable during use of the exercise machine (10), and wherein the predefined operating condition comprises the time-of-flight sensor (20) and the reflective element (15) being immobile.

Item 8: The method of any one of items 1-7, wherein the predefined operating condition corresponds to a maximum or minimum distance between the time-of-flight sensor (20) and the reflective element (15).

Item 9: The method of any one of items 1-8, further comprising: performing said obtaining (301) responsive to a signal indicative of the predefined operating condition of the exercise machine (10).

Item 10: The method of any one of items 1-9, wherein the maintenance comprises cleaning a signal transmissive surface (25) of the time-of-flight sensor (20).

Item 11: The method of any one of items 1-10, wherein the time-of-flight sensor (20) is configured to generate the measurement signal as a function of a phase difference between outgoing and incoming signals.

Item 12: The method of any one of items 1-11, further comprising: providing (306) an output signal indicative of the need for maintenance.

Item 13: The method of any one of items 1-12, wherein the exercise machine (10) comprises one or more moveable weights (11), and wherein the time-of-flight sensor (20) or the reflective element (15) is arranged on the one or more moveable weights (11), the measurement signal of the time-of-flight sensor (20) during use of the exercise machine (10) being indicative of movement of the one or more moveable weights (11).

Item 14: A computer-readable medium comprising computer instructions (44) which, when executed by a processor (42), cause the processor (42) to perform the method of any one of items 1-13.

Item 15: An apparatus configured to detect a need for maintenance of an exercise machine (10) comprising a time-of-flight sensor (20), the apparatus comprising: an input (46) for receiving a measurement signal from the time-of-flight sensor (20), and logic (41, 43) configured to:

obtain the measurement signal via the input (46), the measurement signal being generated by the time-of-flight sensor (20) at a predefined operating condition of the exercise machine (10);

determine, based on the measurement signal, a measured distance (Dc) between the time-of-flight sensor (20) and a reflective element (15) in the exercise machine (10); and evaluate the measured distance (Dc) for detection of the need for maintenance.

Item 16: A method of detecting a need for maintenance of an exercise machine (10) comprising a time-of-flight sensor (20), the method comprising:

obtaining (601), by the time-of-flight sensor (20) during a measurement period, a plurality of measurement values indicative of measured distance between the time-of-flight sensor (20) and a reflective element (15) in the exercise machine (10), each of the measurement values corresponding to a respective signal pulse emitted by the time-of-flight sensor (20);

computing (602) one or more evaluation parameters (EPD) as a function of the plurality of measurement values; and evaluating (603, 604) the one or more evaluation parameters (EPD) for detection of the need for maintenance.

Item 17: The method of item 16, wherein the one or more evaluation parameters (EPD) represent a distribution of the plurality of measurement values.

Item 18. The method of item 17, wherein the computing (602) comprises determining a count of measurement values that are indicative of distances that fall within a distance interval (ΔD) which is a subset of a total measurement range of the time-of-flight sensor (20).

Item 19. The method of item 18, wherein the distance interval (ΔD) is located at a lower end of the total measurement range of the time-of-flight sensor (20).

Item 20. The method of item 18 or 19, wherein the computing (602) further comprises determining a peak value (Cp) in a histogram of the plurality of measurement values.

Item 21. The method of item 20, wherein the evaluating (603, 604) comprises evaluating the count in relation to the peak value.

Item 22. The method of any one of items 17-21, wherein the evaluating (603, 604) comprises evaluating the distribution in relation to a reference distribution.

Item 23. The method of any one of items 16-22, wherein the obtaining (601) is performed when an actual distance between the time-of-flight sensor (20) and the reflective element (15) is known to be outside the distance interval (ΔD).

Item 24: The method of any one of items 16-23, wherein the maintenance comprises cleaning of a signal transmissive surface (25) of the time-of-flight sensor (20).

Item 25: The method of any one of items 16-24, wherein the time-of-flight sensor (20) is configured to generate the plurality of measurement values as a function of a time difference between outgoing and incoming signal pulses.

Item 26: The method of any one of items 16-25, further comprising: providing (605) an output signal indicative of the need for maintenance.

Item 27: The method of any one of items 16-26, wherein the exercise machine (10) comprises one or more moveable weights (11), and wherein the time-of-flight sensor (20) or the reflective element (15) is arranged on the one or more moveable weights (11), the measurement signal provided by the time-of-flight sensor (20) during use of the exercise machine (10) being indicative of movement of the one or more moveable weights (11).

Item 28: A computer-readable medium comprising computer instructions (44) which, when executed by a processor (42), cause the processor (42) to perform the method of any one of items 16-27.

Item 29: An apparatus configured to detect a need for maintenance of an exercise machine (10) comprising a time-of-flight sensor (20), the apparatus comprising: an input (46) for receiving a measurement signal from the time-of-flight sensor (20), and logic (41, 43) configured to:

obtain, via the input (46), a plurality of measurement values indicative of distance between the time-of-flight sensor (20) and a reflective element (15) in the exercise machine (10), each of the measurement values corresponding to a respective signal pulse emitted by the time-of-flight sensor (20) during a measurement period;

compute one or more evaluation parameters (EPD) as a function of the plurality of measurement values; and evaluate the one or more evaluation parameters (EPD) for detection of the need for maintenance.

What is claimed is:

1. A method of determining a need for maintenance of an associated exercise machine including a time-of-flight sensor and a reflective element, the method comprising:
   obtaining a measurement signal from the time-of-flight sensor at a predefined operating condition of the exercise machine;
   determining, based on the measurement signal, a measured distance between the time-of-flight sensor and the reflective element; and
   determining the need for maintenance based on detecting a decrease in the measured distance over time.

2. The method of claim 1, wherein the determining the need for maintenance comprises checking the measured distance with respect to a reference distance.

3. The method of claim 2, further comprising:
   receiving a further measurement signal generated by the time-of-flight sensor at a reference time when the exercise machine is in the predefined operating condition; and
   determining the reference distance as a function of the further measurement signal generated by the time-of-flight sensor at the reference time.

4. The method of claim 2, wherein said obtaining comprises obtaining the measurement signal for a first range setting of the time-of-flight sensor, the method further comprising:
   receiving a further measurement signal from the time-of-flight sensor for a second range setting of the time-of-flight sensor at the predefined operating condition of the exercise machine, the second range setting being different from the first range setting; and
   determining the reference distance based on the further measurement signal received from the time-of-flight sensor for the second range setting.

5. The method of claim 2, wherein the reference distance is a predefined distance associated with the predefined operating condition of the exercise machine.

6. The method of claim 2, wherein the need for maintenance is detected when a difference between the measured distance and the reference distance exceeds a threshold.

7. The method of claim 1, wherein at least one of the time-of-flight sensor and the reflective element is moveable during use of the exercise machine, and wherein the predefined operating condition comprises the time-of-flight sensor and the reflective element being immobile.

8. The method of claim 1, wherein the predefined operating condition corresponds to a maximum or minimum distance between the time-of-flight sensor and the reflective element.

9. The method of claim 1, further comprising: performing said obtaining responsive to a signal indicative of the predefined operating condition of the exercise machine.

10. The method of claim 1, wherein the maintenance comprises cleaning a signal transmissive surface of the time-of-flight sensor.

11. The method of claim 1, wherein the time-of-flight sensor is configured to generate the measurement signal as a function of a phase difference between outgoing and incoming signals.

12. An apparatus configured to determine a need for maintenance of an associated exercise machine including a time-of-flight sensor and a reflective element, the apparatus comprising:
    an input for receiving a measurement signal from the time-of-flight sensor; and
    logic configured to:
        obtain the measurement signal via the input, the measurement signal being generated by the time-of-flight sensor at a predefined operating condition of the exercise machine;
        determine, based on the measurement signal, a measured distance between the time-of-flight sensor and the reflective element; and
        determine the need for maintenance based on detecting a decrease in the measured distance over time.

13. A method of determining a need for maintenance of an associated exercise machine including a time-of-flight sensor and a reflective element, the method comprising:
    obtaining, by the time-of-flight sensor during a measurement period, a plurality of measurement values indicative of measured distance between the time-of-flight sensor and the reflective element, each of the measurement values corresponding to a respective signal pulse emitted by the time-of-flight sensor;
    computing one or more evaluation parameters as a function of the plurality of measurement values; and
    determining the need for maintenance based on detecting a decrease in the measured distance over time.

14. The method of claim 13, wherein the one or more evaluation parameters represent a distribution of the plurality of measurement values.

15. The method of claim 14, wherein the computing comprises determining a count of measurement values that are indicative of distances that fall within a distance interval which is a subset of a total measurement range of the time-of-flight sensor.

16. The method of claim 15, wherein the distance interval is located at a lower end of the total measurement range of the time-of-flight sensor.

17. The method of claim 15, wherein the computing further comprises determining a peak value in a histogram of the plurality of measurement values.

18. The method of claim 17, wherein the determining the need for maintenance further comprises evaluating the count in relation to the peak value.

19. The method of claim 14, wherein the determining the need for maintenance further comprises evaluating the distribution in relation to a reference distribution.

20. The method of claim 13, wherein the obtaining is performed when an actual distance between the time-of-flight sensor and the reflective element is known to be outside of a distance interval.

* * * * *